2,778,415

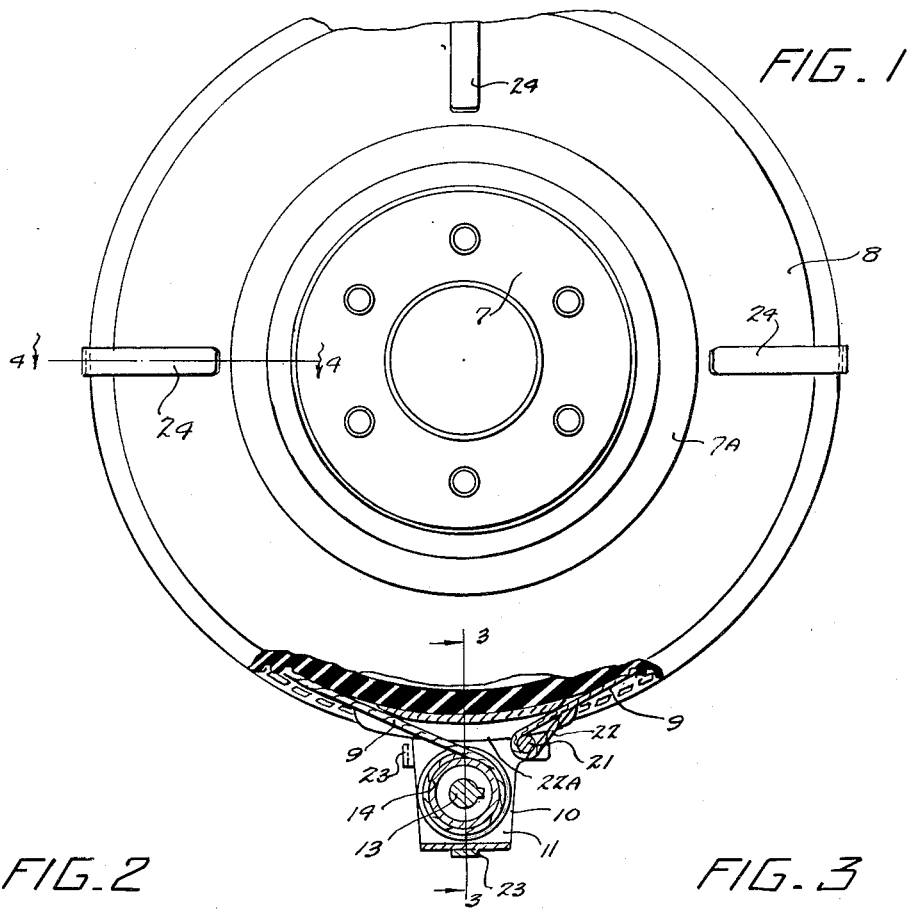
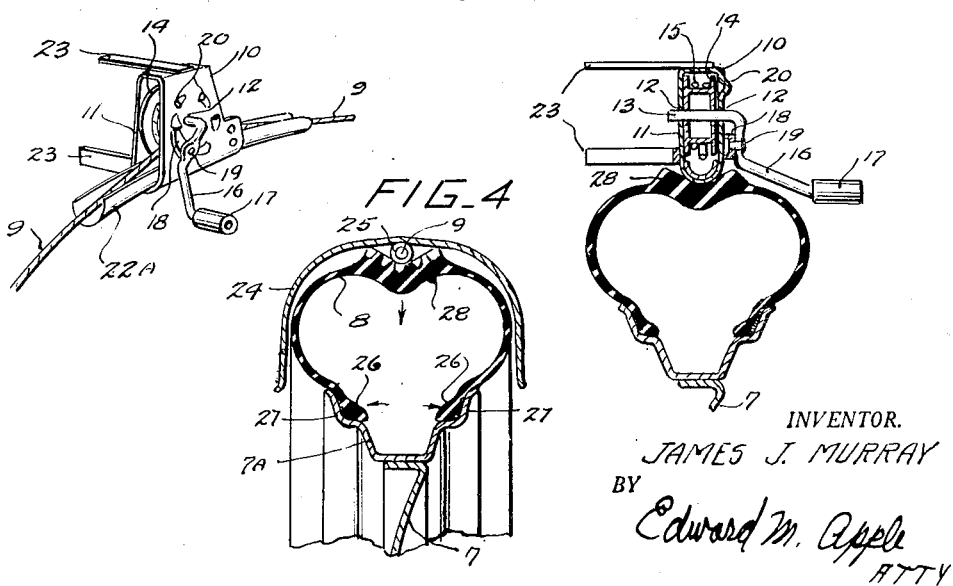

BEAD SEATING TOURNIQUET FOR TUBELESS TIRES

James J. Murray, Ferndale, Mich.

Application December 20, 1954, Serial No. 476,473

1 Claim. (Cl. 157—1.21)

This invention relates to automotive accessories and has particular reference to a device for use in installing tubeless tires to wheel rims.

Many automotive vehicles are now being equipped with tubeless tires, which are substantially channel shaped in cross section and which are held on to the wheel rim by the outward pressure developed when the tire is inflated, whereby the wheel rim becomes the closure member for the open portion of the tire. When such a tire is deflated it rests loosely in the wheel rim and it is difficult to re-inflate because of the loose engagement of the free edges of the tire with the rim portion of the wheel.

It is therefore an object of this invention to provide means for creating inwardly directed pressure along the outside periphery of the tire, during the installation of the tire to the rim, so that there is an outward pressure exerted along the free edges of the tire, whereby to bring them into close contact with the wheel rim, and whereby to seal the parts during the initial re-inflation of the tire. The device is removed after the internal pressure again becomes sufficient to outwardly expand the tire and lock it into secure relation with the rim.

Another object of the invention is to provide a device which is constructed and arranged so that it may be adjusted for use with tires of any size.

Another object of the invention is to provide a device for the character indicated which is simple in construction and economical to manufacture and efficient in operation.

Another object of the invention is to provide a device of the character indicated which is constructed with means for developing greater pressure on the outer periphery of a tire together with means for preventing the displacement of the pressure developing means while being used.

Another object of the invention is to provide a device for the character indicated which is provided with supporting means whereby the device may rest in a horizontal position on the floor or a table or work bench or the like, while it is being used.

Another object of the invention is to provide a device for the character indicated which is highly portable and one which may be collapsed into a comparatively small space for transportation and installation.

Although I have herein illustrated a simple manual arrangement for developing the pressure it will be understood that hydraulic, pneumatic, electric or other types of mechanical power may be employed, all of which are within the contemplation of the invention.

The foregoing and other objects and advantages of the invention will become more apparent as the description proceeds, reference being made from time to time to the accompanying drawing, in which drawing:

Fig. 1 is a plan view with parts in section of a device embodying the invention and showing the device being employed during the installation of a tubeless tire to the rim of an automobile wheel.

Fig. 2 is an enlarged detail in perspective showing the manually operated power means for developing the pressure.

Fig. 3 is a section taken substantially on the line 3—3 of Fig. 1 and Fig. 4 is a section taken substantially on the line 4—4 of Fig. 1.

Referring now more particularly to the drawing, it will be understood that in the embodiment herein described the reference character 7 indicates a disc wheel for a motor vehicle on which is being installed a tubeless tire 8 by a cable 9 and pressure generating means 10 which I will now describe.

The pressure generating means 10 consists of a metal housing 11 having openings 12 therethrough for receiving a shaft 13 on which is mounted for rotation therewith a spool or drum 14 on which is adapted to be wound the cable 9, one end of which is secured to the drum as at 15 (Fig. 3). The shaft 13 and the drum 14 are rotated by means of a crank 16, having a hand grip 17. The crank 16 is provided with a pawl 18 which is pivoted thereto as at 19, which pawl is arranged to engage a plurality of stops 20, formed on the housing 11, so that the crank 16 and the drum 14 may be locked against reverse motion when pressure is being applied to the tire through the cable 9. The housing 11 is provided with a stud 21 for receiving the looped end 22 of the cable 9 so that the cable may easily be mounted to and detached from the tire and pressure means. The housing 11 is also provided with a channel like bearing member 22A which is convexly curved to conform to the periphery of the tire. The housing 11 is also provided with a pair of legs 23 so that the device may be supported in a horizontal position with the crank 16 and 17 disposed upwardly, so that the tire 8 may be applied to the rim 7A while the wheel 7 and the tire 8 are lying in a horizontal position.

In order to prevent the cable 9 from being displaced from the center of the tread of the tire 8 when pressure is being exerted on the cable, I provide a plurality of U shaped members 24 which span the outside of the tire 8 as shown in Figs. 1 and 4. Each member 24 is provided with an eye (Fig. 4) for slidably receiving the cable 9.

In using the device the tire 8 is first positioned about the wheel 7 so that the free edges 26 of the tire 8 are in proper alignment with the rim elements 27 (Fig. 4), this may be done when the wheel and tire are in either vertical or horizontal position. The tourniquet is then applied to the tire 8 by first positioning the bearing member 22 and the lower portion of the housing 27 at a certain position on the outer periphery of the tire 8. When this position is assumed the cable 9 is unwound on the drum 14 and the looped end 22 is free from the stud 21, so that the cable 9 may be easily extended along the outer periphery of the tire 8, along the median line of the tire tread. The elements 24 are then spaced along the tire to hold the cable in line. The loop 22 is then secured to the stud 21 and the crank 16 is rotated, which in turn rotates the drum 14 to tighten the cable 9. The shortening of the cable 9 by the rotation of the drum 14, causes the tread portion of the tire 28 to be forced inwardly as shown in Figs. 4 and 5, at the same time forcing the free edges 26 of the tire outwardly against the rim portion 27. While the tire is so compressed, it may then be readily inflated in the usual manner and as soon as the inflating pressure is sufficient to hold the tire, and remain in air tight condition, the tourniquet may be removed.

Having described my invention what I claim and desire to secure by Letters Patent is:

A device for use in assembling a tubeless tire to a wheel rim comprising in combination a curved, inverted channel-like bearing member for contacting an outer circumferential portion of said tire, a drum rotatably supported by said bearing member, a cable secured at one end to said drum and removably secured at the other end to said bearing member, means for keeping said cable centered on the tread of the tire, said means comprising a plurality of inverted U shaped members, having eyes for slidably receiving said cable, crank means to rotate said drum, whereby to shorten the length of said cable, means to lock said rotating means, and means for supporting said bearing member and spacing same from the floor when the tire and rim are horizontally disposed.

References Cited in the file of this patent

UNITED STATES PATENTS

| | | |
|---|---|---|
| 371,310 | Fitzgerald | Oct. 11, 1887 |
| 641,768 | Grant | Jan. 23, 1900 |
| 752,870 | Smith | Feb. 23, 1904 |
| 1,200,706 | Brost | Oct. 10, 1916 |
| 1,252,645 | Baier et al. | Jan. 8, 1918 |
| 1,966,580 | Bull | July 17, 1934 |
| 1,978,646 | Oishei et al. | Oct. 30, 1934 |
| 2,684,112 | Coats | July 20, 1954 |